J. KIDD.
LEVEL.
APPLICATION FILED JULY 17, 1918.
1,381,844.
Patented June 14, 1921.
2 SHEETS—SHEET 1.
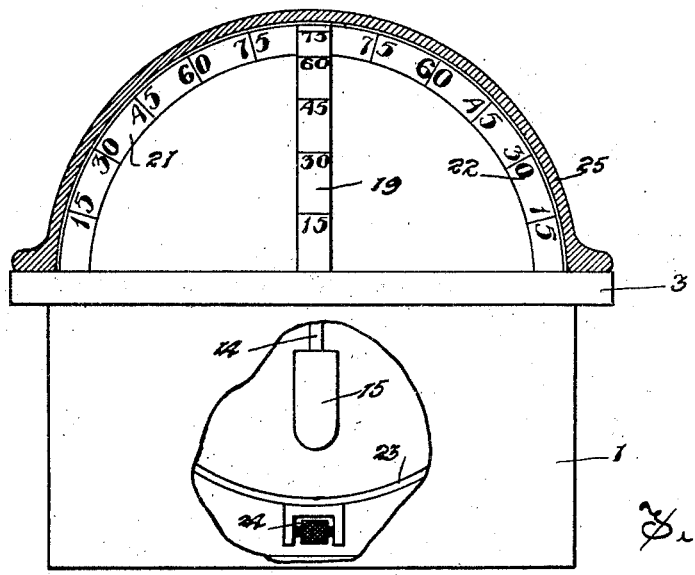
Fig. 1
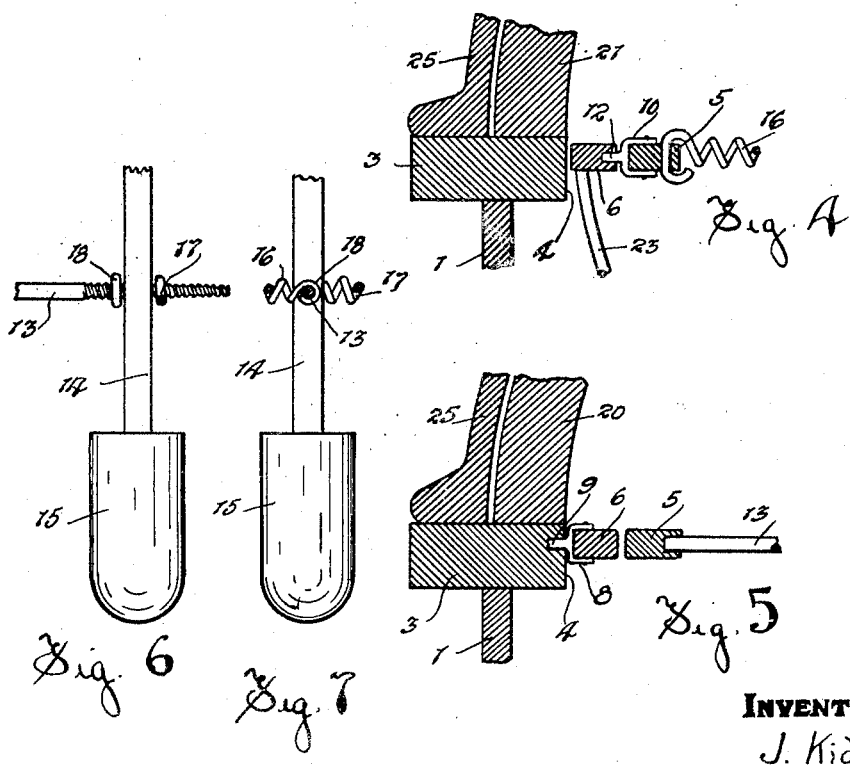
INVENTOR
J. Kidd
BY
ATTYS

J. KIDD.
LEVEL.
APPLICATION FILED JULY 17, 1918.

1,381,844.

Patented June 14, 1921.
2 SHEETS—SHEET 2.

INVENTOR
J. Kidd
BY
ATTYS

UNITED STATES PATENT OFFICE.

JOSEPH KIDD, OF WINNIPEG, MANITOBA, CANADA.

LEVEL.

1,381,844. Specification of Letters Patent. Patented June 14, 1921.

Application filed July 17, 1918. Serial No. 245,381.

*To all whom it may concern:*

Be it known that I, JOSEPH KIDD, of the city of Winnipeg, in the Province of Manitoba, Canada, have invented certain new and useful Improvements in Levels, of which the following is the specification.

The invention relates to improvements in levels and the object of the invention is to provide a level which will at all times and in all positions indicate the vertical position and which is arranged such that the observer can at all times take accurate readings to determine the position in respect to the vertical.

A further object is to construct the level in a simple, durable and inexpensive manner and so that the readings can be readily taken.

With the above more important and other minor objects in view, which will become more apparent as the description proceeds, the invention consists essentially in the arrangement and construction of parts hereinafter more particularly described and later pointed out in the appended claims, reference being had to the accompanying drawings in which:—

Figure 1 represents a front view of the level with part of the box broken away.

Fig. 4 represents an enlarged detailed vertical sectional view through the level, the section being taken in the plane denoted by the line Y—Y′ Fig. 2.

Fig. 5 represents an enlarged detailed vertical sectional view through the level, the section being taken in the plane denoted by the line Z—Z′ Fig. 2.

Fig. 6 represents an enlarged detailed side view of part of the pointer and spindle carrying the same.

Fig. 7 represents a front view of the parts appearing in Fig. 6.

In the drawings like characters of reference indicate corresponding parts in the several figures.

Figure 3:
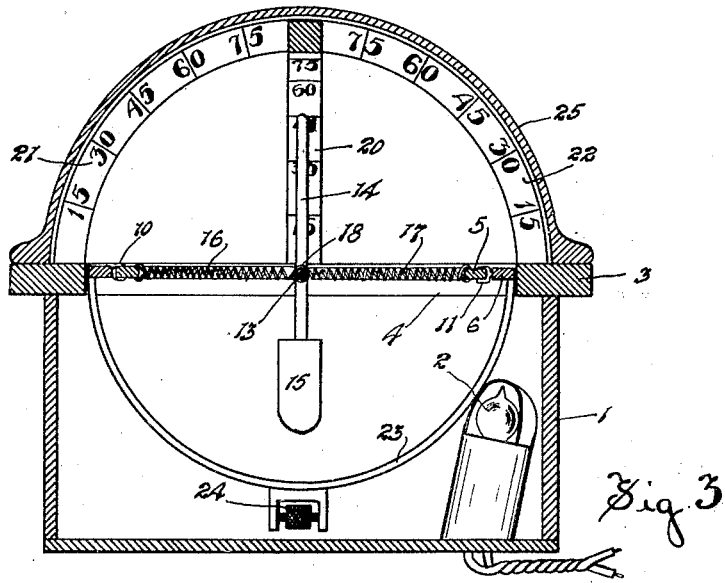
Fig. 3 represents a vertical sectional view through the level, the section being taken in the plane denoted by the line X—X′ Fig. 2.
Figure 2:
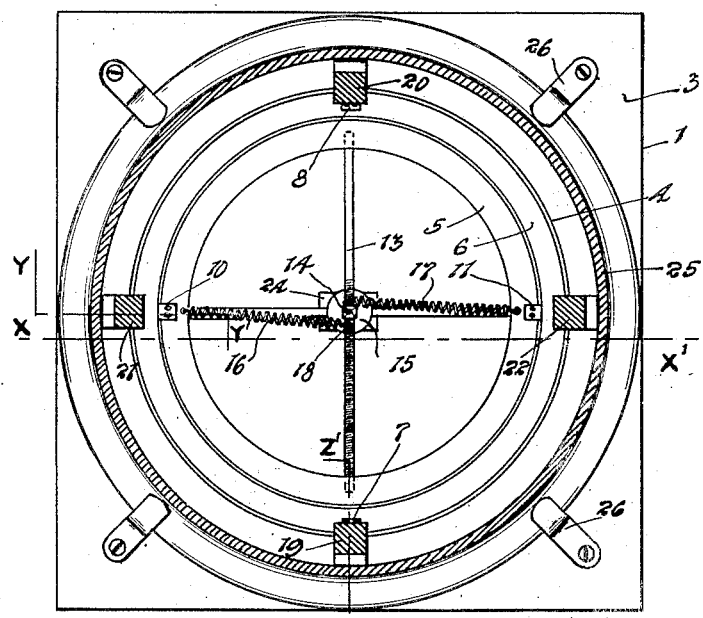
Fig. 2 represents a plan view of the level with the glass globe shown in horizontal section and the reading scales broken away.

1 represents a substantially square box forming a support for the level parts and containing an electric light 2 for illuminating purposes. The box is fitted with a top plate 3 which has the center thereof cut away to provide a circular opening 4 forming a stationary outer ring.

Within the outer ring I mount two concentric inner and intermediate rings 5 and 6 which are pivoted one to the other and to the box top in a manner now described.

At diametrically opposite points the intermediate ring is fitted with a pair of clips 7 and 8 each of which carries a pivot pin 9 (see Fig. 5) which is rotatably mounted in the outer ring or top 3 of the box. At diametrically opposing points positioned ninety degrees from the clips 7 and 8 I secure to the inner ring another pair of clips 10 and 11 each of which is provided with a pivot pin 12 rotatably mounted in the sides of the ring 6.

In this way it will be apparent that the two rings 5 and 6 are balanced, the ring 6 being mounted to swing in respect to the top of the box on an axis passing diametrically across the circle 4, while the inner ring is mounted in respect to the ring 6 to swing on an axis located at right angles to the swinging axis of the said ring 6.

13 represents a spindle passing diametrically across the inner ring and having the ends thereof rotatably mounted in the sides of the inner ring. The spindle is located with the ends in a position at ninety degrees from the pivot pins 12 or in other words, the pivot spindle is normally axially alined with the pivot pins 9.

On this spindle I locate centrally a pointer 14 which, in the present instance, is shown as screw threaded on to the spindle which allows of the adjustment of the pointer of the spindle as occasion may demand, the adjustment being accomplished by holding the pointer stationary and turning the spindle.

The lower end of the pointer is provided with a weight 15 which acts at all times to maintain the pointer in a vertical position and in this connection it is to be understood that the frictional contact between the threads of the spindle and the pointer is sufficient to cause the pointer to turn the spindle in maintaining its vertical position.

In order to retard the movement of the pointer I have inserted a pair of tension springs 16 and 17 between the spindle and the inner ring, the springs having their outer ends attached to the ring and their inner ends looped around the spindle as indicated at 18 (see Fig. 7).

According to this arrangement it will be obvious that the tension in the springs pulls the loops against the spindle and effects a frictional contact which will operate to retard the swinging of the pointer under the action of the weight.

To the top of the box I secure permanently four upstanding degree scales 19, 20, 21 and 22 which are positioned ninety degrees apart and are arranged concentric to the point of suspension of the pointer.

In the drawings I have placed numerals on the scales which indicate degrees and all the scales read from zero degrees at the box top to ninety degrees at the point of intersection of the scales.

According to this arrangement it will be apparent that as the box is tilted the pointer in maintaining the vertical position will point to a reading on the scales and a reading can also be taken from the rings which in swinging will swing up and down the scales as the box is turned. To the underside of the ring 6 I attach a semi-circular strip 23 which is positioned in a location at ninety degrees to the spindle and to this strip I secure an adjustable weight 24 which is located normally directly below the weight 15. This weight serves to maintain the ring 6 in the horizontal position when the box is tilted sidewise and the weight at the lower end of the pointer will obviously act to maintain the inner ring in the horizontal position when the box is tilted endwise. The working parts of the level are inclosed by a transparent globe 25 such as a glass globe and this is fastened in any suitable manner such as by corner clips 26 to the top.

To understand the action of this level and how the readings are taken it is assumed first that the box is tilted sidewise to the left at say an angle of thirty degrees. In such an instance the reading would be taken on the scale 21 and it would be found that the side of the ring 6 next the scale would be directly opposite thirty degrees. On the other hand if the box were tilted ahead, say thirty degrees to the horizontal, the reading would be taken from the scale 20 and in a location directly opposite the then adjoining side of the inner ring one would find the reading 30 on the scale.

Similarly, if the box be tilted sidewise to the right thirty degrees the reading on the scale 22 opposite the ring 6 would indicate thirty degrees while if the box were tilted toward the observer at an angle of thirty degrees the reading on the scale 19 opposite the inner ring would be thirty degrees.

During all these movements the vertical position is indicated by observing the pointer which stands at all times vertical.

While I have taken definite angles in the above explanation, it will be understood that the amount of tilt given in any instance, either forward or back or latterly, is indicated directly by the proper readings on the scales.

This device will be found particulary useful for aerial or submarine navigation where oftentimes it is very difficult for the pilot to determine his precise position. Obviously if the box were stationarily mounted preferably in front of the pilot he will know by direct observation what position his machine or boat is in.

I have not considered it necessary to enlarge on any further uses of the level as such are obvious to one familiar with an instrument of this class.

A feature which I wish to point out is that this level will indicate the vertical position even if it be turned upside down as owing to the weights 15 and 24 the rings will turn over completely when the box is turned over and the pointer will always maintain the vertical position. This is important in aerial navigation as one in flying very often gets out of sight of the earth and has trouble in determining, with the present type of levels, whether his machine is right side up or upside down.

What I claim as my invention is:—

1. In combination, a support providing a stationary outer ring, an intermediate ring pivoted to the outer ring at diametrically opposite points, an inner ring pivotally connected to the intermediate ring and with the pivot points located 90 degrees from the connections between the intermediate ring and the outer ring and a pointer located centrally of the inner ring and mounted on a pivot spindle located at right angles to the pivot suspension of the inner ring, the pointer being threadedly engaged with the spindle and adjustable longitudinally thereof.

2. In combination, a support providing a stationary outer ring, an intermediate ring pivotally connected to the outer ring at diametrically opposite points, an inner ring pivotally connected to the intermediate ring and with the pivot points located at 90 degrees from the pivot connections between the intermediate ring and the outer ring, a cross spindle having the ends thereof pivotally mounted in the inner ring and positioned 90 degrees from the pivot points of the inner ring and weighted pointer located centrally of the spindle, and tension springs extending between the pointer and diametrically opposite points on the said inner ring.

3. In combination, a support providing a stationary outer ring, an intermediate ring pivotally connected to the outer ring at diametrically opposite points, an inner ring pivotally connected to the intermediate ring and with the pivot points located at 90 degrees from the pivot connections between the intermediate ring and the outer ring, a threaded cross spindle having the ends thereof pivotally mounted in the inner ring and positioned 90 degrees from the pivot points of the inner ring, an adjustable weighted pointer located centrally of the spindle and threaded thereon and a weight connected to the intermediate ring.

Signed at Winnipeg, this 7 day of May, 1918.

JOSEPH KIDD.

In the presence of—
G. S. ROXBURGH,
K. B. WAKEFIELD.